Dec. 27, 1960     J. T. COURTNEY     2,966,064
DEVICE FOR CONVERTING LINEAR TO ROTARY MOTION
Filed March 24, 1958     3 Sheets-Sheet 1
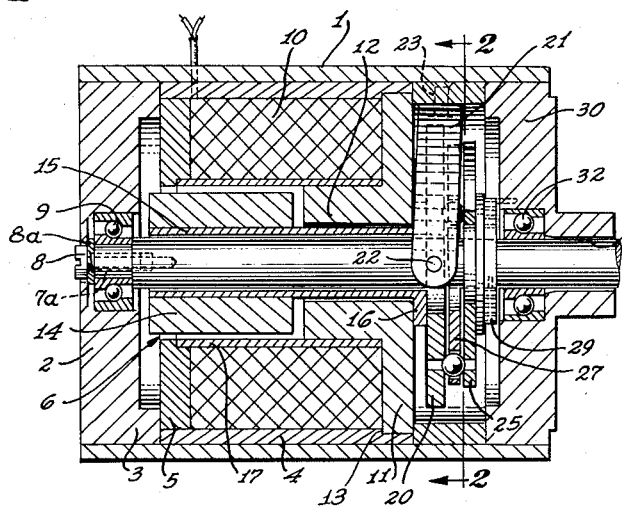
Fig.1
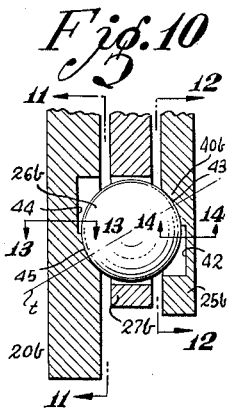
Fig.10
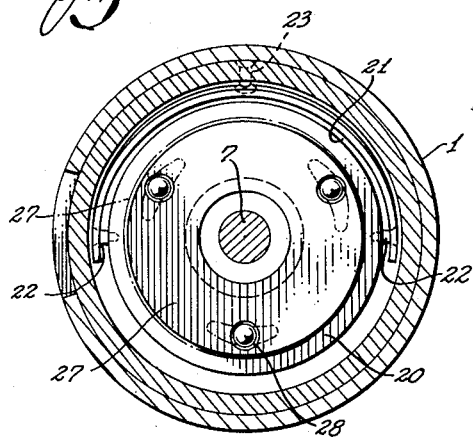
Fig.2
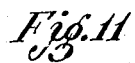
Fig.11
Fig.12
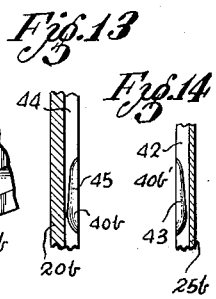
Fig.13    Fig.14
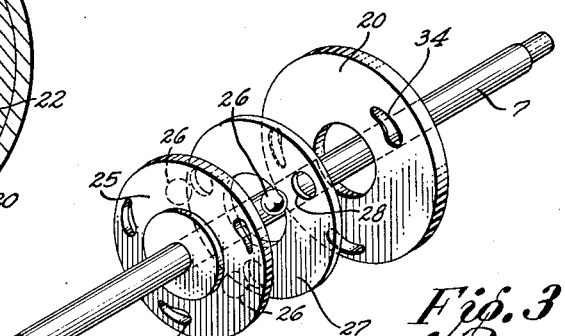
Fig.3
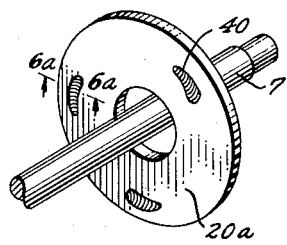
Fig.3a
INVENTOR:
James T. Courtney
His Patent Attorney Dec. 27, 1960  J. T. COURTNEY  2,966,064
DEVICE FOR CONVERTING LINEAR TO ROTARY MOTION
Filed March 24, 1958  3 Sheets-Sheet 2

INVENTOR.
James T. Courtney
By
His Patent Attorney

Dec. 27, 1960 J. T. COURTNEY 2,966,064
DEVICE FOR CONVERTING LINEAR TO ROTARY MOTION
Filed March 24, 1958 3 Sheets-Sheet 3

INVENTOR:
James T. Courtney

His Patent Attorney

United States Patent Office 2,966,064
Patented Dec. 27, 1960

2,966,064

DEVICE FOR CONVERTING LINEAR TO ROTARY MOTION

James T. Courtney, Torrance, Calif., assignor to Carol R. Metcalf, Malibu, Calif.

Filed Mar. 24, 1958, Ser. No. 723,317

14 Claims. (Cl. 74—89)

My invention relates to devices for converting linear to rotary motion, and more particularly to a device having a cooperating pair of members wherein one of said members is moved linearly only to provide a rotary motion only of the other member.

Among the objects of the present invention are, to provide a ball bearing between a member moving linearly only to create a rotary motion only of the other member, and vice versa on a return stroke.

To provide an actuator providing an oscillating rotary motion only of an output shaft.

To provide a double acting rotary actuator.

To provide a rotary actuator having high torque.

To provide a solenoid operated rotary actuator utilizing a solenoid operated return stroke.

To provide a rotary actuator having a minimum of rotary inertia.

To provide a rotary actuator assembly providing rotary oscillation only of an output shaft adaptable for power operation on both initial and return stroke.

To provide a rotary actuator assembly capable of operation by any type of power linearly applied.

To provide a rotary actuator assembly capable of operation by any type of power on either or both initial and return stroke.

And to provide a simple rotary actuator for converting linearly applied power to rotary motion.

Briefly stated, the basic assembly of the present invention comprises two preferably coaxially mounted adjacent members conveniently in disc form. One of these members is mounted and constrained to move axially only, and the other of these members is mounted and constrained to perform rotary motion only. The two members are coupled by a plurality of rolling elements operating in races shaped and contoured to permit movement of the auxiliary movable member under applied power toward the rotatably movable member to cause a rotary movement of the latter member. After the initial stroke, the discs are separated by power applied to the rotatable members as by a spring or in one preferred embodiment by a second source of applied power. Linear power may be supplied by a solenoid operated armature, a cam or piston as may be desired, for example. In a double acting embodiment, the power is supplied on both initial and return strokes by respective solenoid controlled cores or armatures.

Other objects, advantages and details of the operation and construction of preferred forms of the present invention will become apparent from a description of the appended drawings, in which Figure 1 is a longitudinal sectional view of a solenoid powered single acting form of the invention utilizing ball and slot camming means to provide shaft rotation.

Figure 2 is a view partly in section and partly in elevation taken as indicated by the line 2—2 in Figure 1.

Figure 3 is an expanded view of the ball and slot camming mechanism as used in Figure 1.

Figure 3a is a perspective view of a shaft and linearly movable disc showing the use of slant surface camming elements.

Figure 10 is a fragmentary sectional view through the cam discs of a device similar to that of Figure 1, taken in a radial plane through the axis of the discs, and showing a modified and present preferred ball and slant surface camming assembly.

Figure 11 is a section on line 11—11 of Figure 10.

Figure 12 is a section on line 12—12 of Figure 10.

Figure 13 is a section on line 13—13 of Figure 10.

Figure 14 is a section on line 14—14 of Figure 10.

Figure 4:
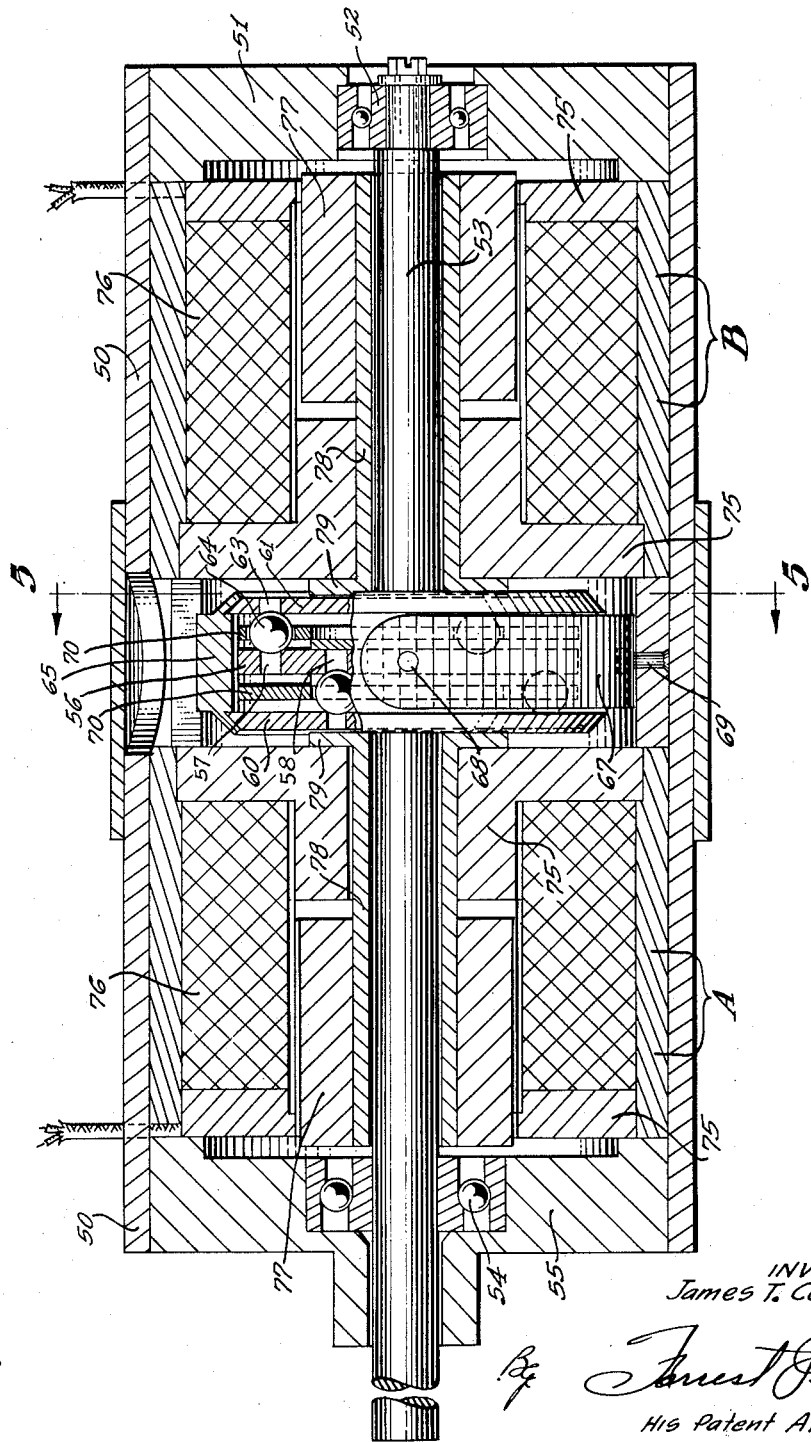
Figure 4 is a longitudinal sectional view of a double acting, solenoid powered actuator, using two opposing ball and slot camming assemblies for maximum power output at the shaft.

Referring first to Figures 1, 2 and 3 for a description of a single acting actuator embodying the present invention, a cylindrical casing 1 is provided having a thrust end plate 2 at one end thereof. End plate 2 has an inwardly extending shoulder 3 thereon against which is positioned an inner cylindrical shell 4 of highly magnetizable material, and a magnetic circuit disc 5 centrally provided with a core aperture 6.

A shaft 7, extending axially through casing 1, has at one end thereof a reduced portion 7a, and is positioned by thrust end plate 2, screw 8, and washer 8a with its reduced portion 7a within thrust bearing 9, held, as by a press fit, in thrust end plate 2.

Figure 9:
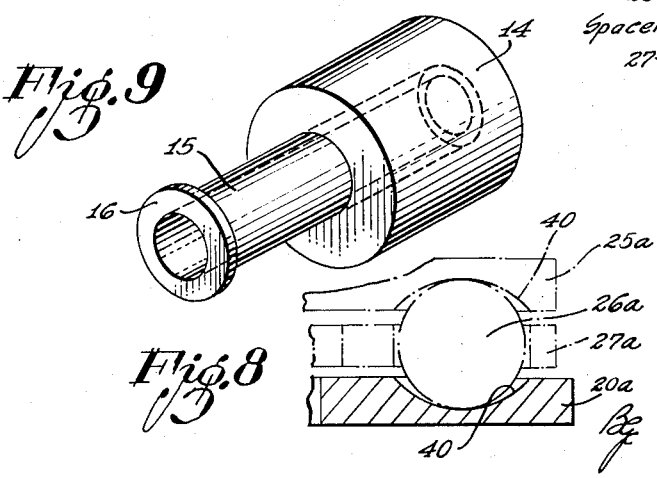
Figure 9 is a perspective view of the solenoid armature used in the devices of Figures 1 and 4.

A hollow solenoid coil 10 is abutted against circuit disc 5 and is held in place by a core disc 11 having an axial tubular extension or shoulder 12 extending into the center bore of coil 10, the disc abutting shoulder 13 of shell 4 on its outer periphery. Thus, an armature space is provided in which a tubular armature 14 is positioned (shown removed in Figure 9). Armature 14 is shrunk onto or otherwise attached to armature sleeve 15 extending axially through the bore of core member 12 to terminate in a thrust shoulder 16. Armature 14 is of highly magnetizable material, but armature sleeve 15 is preferably of brass. A larger diameter brass sleeve 17 lines the central bore of coil 10. The inside diameter of sleeve 15 is sized to bear only loosely on shaft 7. Space is left between armature 14 and the end of shoulder 12 so that armature 14 can be axially movable toward shoulder 12 when the coil 10 is energized.

An axially movable floating disc 20 is centrally cut away to clear shaft 7. This axially movable disc 20, just outside of its central aperture, bears on thrust shoulder 16 of the cylinder 15 attached to core 14.

Axially movable disc 20 is held in place radially and kept from rotating by a rocking positioning yoke 21 of semicircular shape, yoke 21 having diametrically opposite inwardly extending disc pins 22 loosely entering the periphery of disc 20, as best shown in Figure 2, and being kept from rotating by a loose connection with a casing pin 23 extending into it midway between disc pins 22. Thus, disc 20 can readily move over a limited distance axially, but cannot rotate. It can also tilt on one diametric axis defined by pins 22, and on a diametric axis at right angles to the first axis by rocking of the yoke about pin 23. In other words, it is universally tiltable.

Shaft 7 is provided with a driven disc 25 fastened securely thereto and coupled to axially movable disc 20 by a plurality of ball and slot cam assemblies later to be described. Preferably three ball and slot assemblies are used, and the balls 26 are kept in synchronism by a ball retainer disc 27 preferably of "Teflon," this disc having circular holes 28 therein slightly larger than the balls.

A return spring 29 is provided outside of driven disc 25, this spring being shown as spiral and attached at one end to shaft 7 and at the other end to an output end plate 30 which has a central bore 31 for shaft 7 to pass through, this bore 31 receiving a shaft ball bearing 32. Thus, except for such restraint as may be provided by the ball and slot camming assemblies shown in Figure 3, shaft 7 is free to rotate, but cannot move axially because of thrust bearing 9.

Figure 7:
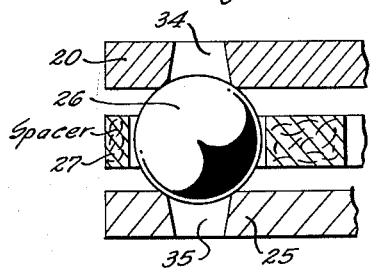
Figure 7 is a cross sectional view of a ball and slot camming element assembly.

The ball and slot camming assemblies shown in Figures 1, 2 and 3 are shown, described and claimed in the Metcalf application, Serial No. 623,082, filed November 19, 1956, and are so constructed and assembled as to impart a rotation to driven disc 25, and to shaft 7, when axially movable disc 20 is moved axially against the balls. To provide such movement, pairs of cam slots 34, 35 are provided, one slot in each pair on each disc. Opposed slots 34 and 35 are provided with arcuate diverging edges in the plane of the respective disc surfaces with the large ends of the slots adjacent and opposed in one terminal rotational relative position of the discs 20 and 25, and with the small ends opposed in another terminal rotational relative position of the discs. The ball 26 coupling each pair of slots is made slightly larger than the widest portion of the slots, and bears against the edges only of the slots as shown in Figures 1 and 7. These edges may be slightly bevelled. When the balls are bearing against the smallest ends of the slots, the discs 20 and 25 are farthest apart; but when force is applied to the axially movable disc, the balls are forced to travel along the slot edges until they are in the largest ends of the slots, and the discs 20 and 25 are closest together. However, during this travel disc 20 cannot rotate, so driven disc 25 must rotate, thereby providing a shaft rotation as may be determined by the angular extent of the opposed slots.

As spring 30 is set to hold the balls in the smallest ends of the slots with the discs at their maximum spacing, this spring is wound during rotation of the shaft 7, the stored energy returning the disc 25 to its original rotational position after power is removed. In so doing, the balls force the axially movable disc back to its original axial position. The original power is provided by energizing solenoid coil 10 to force armature 14 inwardly and thus impart axial thrust to axially movable disc 20 through cylinder 15 and thrust shoulder 16. To prevent shock, only a few thousandths clearance is preferably used between thrust shoulder 16 and axially movable disc 20. The axially moving disc 20 has been described as "floating," and it will be seen in this connection that its mounting yoke 21, loosely connected to the casing, restrains rotation of the disc, but accommodates axial movement thereof, and also a degree of lateral cocking or tipping in event of lack of precision in the ball races owing to inevitable manufacturing tolerances. Thus, because of the three points of support by the three balls, slight inaccuracy at one race will cause the disc to cock or tip slightly. This permits proper seating of all balls in all races, and assures proper functioning of the device. In this connection, it will be observed that the thrust shoulder 16 on the end of armature sleeve 15 is not fast with floating disc 20, but merely makes contact therewith. Also, the perimeter of thrust shoulder 16 is spaced inside the circle of the arcuate ball races. Engagement of shoulder 16 with disc 20 accordingly as- sures that the arcuate ball races in disc 20 will properly engage all three of the coupling balls and will hold them in proper seating engagement with all the ball races in disc 25, disc 20 tilting slightly, if necessary, i.e., in the event of lack of precision in the ball races, to accomplish this proper seating engagement of the discs 20 and 25 with the balls. It will be clear that this slightly tilted position of disc 20 is requisite in many cases to assure proper ball seating and, therefore, proper functioning of the device. As a further consideration, because of the absence of a rigid connection between the disc 20 and the thrust shoulder 16 on armature sleeve 15, the latter is not positively constrained to cock through the same angle as the disc 20 may assume, as would in some cases cause tight binding on shaft 7. Of course, the reaction of the tilted disc 20 on the edge of shoulder 16 would evidently tend toward a corresponding angular displacement of sleeve 15. However, the lever arm length over which any component of cocking force might be exerted on sleeve 15 is merely the radius of shoulder 16, rather than the radius of disc 20 at the ball races, as would be the case if disc 20 were fast with shoulder 16, and any such side thrust is confined within permissible bounds. Also, assuming disc 20 to tilt under axial thrust through a greater angle than can thrust sleeve 15 within the tolerance space afforded between the sleeve 15 and shaft 7, disc 20 will move angularly relative to shoulder 16 as required, while, for reasons explained above, side thrust of sleeve 15 on shaft 7 remains inconsequential. As neither armature 14 nor axially movable disc 20 rotates, no antifriction bearing is needed therebetween.

Figure 8:
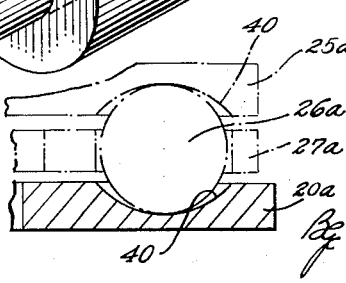
Figure 8 is a cross sectional view of a ball and slant surface camming element assembly.

While I may use the Metcalf slot and ball assembly as described for camming, my invention is not limited to its use but can also utilize other camming devices such as, for example, the ball and slant surface camming races shown in the U.S. Patent No. 1,585,140, isssued to Erban May 18, 1926, particularly recessed camming surfaces of the type shown in Figure 11 of Erban. Such slant surfaces are herein shown in Figure 3a on an axially movable disc 20a as might be used in the device of Figure 1, and also as shown in more detail in Figures 6a and 8. In this case the opposed discs 20a and 25a are provided with pairs of arcuate recesses 40 having slanted bottom surfaces, the balls 26a running on these bottom surfaces being smaller than the recesses, as best shown in Figure 8. The recesses are opposed so that the balls in one terminal rotational position are at the tops of the slant surfaces; and at the other terminal rotational position, the balls are at the bottoms of the slant surfaces. Thus, the discs are cammed toward and away from each other to provide the desired rotation of shaft 7 upon axial movement of axially movable disc.

Figure 6A:
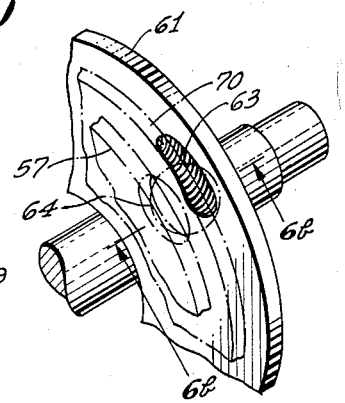
Figure 6a is a partial perspective view of a camming assembly using ball and slant surface camming elements.

The invention provides also an advantageous modification of slant surface cam groove, as shown in Figures 10 to 13. In this case, the outer portion of one slant surface cam groove of the design of Figures 3a, 6a and 8 is removed, and the inner portion of the coacting slant surface cam groove is likewise removed. Thus, an annular groove 42 is sunk into disc 25b, with an inner radius such that the inner edge of the groove is just inside the center of ball 26b, providing a tapering cam groove 40b with a slant bottom surface 43 of arcuate cross section which is, in effect, the inside portion of the groove 40 of Figure 3a. Also, annular groove 44 is sunk into disc 20b, with its outer radius such that the outside edge of the groove is just outside the center of ball 26b, providing a reversely tapering cam groove 40b', with a slant bottom surface 45, of arcuate cross section, which is, in effect, the outside portion of the groove 40 of Figure 3a. A ball spacer 27b is preferably used, as shown. The radius of curvature of the ball is somewhat less than the radius of curvature of the cam grooves, as seen in cross section, preferably, however, by only a few thousandths of an inch, such as is impossible to illustrate in the drawings. The cam grooves, which are preferably formed with a cutting tool of slightly larger radius of curvature than that of the cam grooves, are also preferably so formed and located that the effective points of contact, or tangency, between each ball and its two cam grooves, is along a diagonal thrust line *t* which, in the aspect of Figure 10, is in the neighborhood of 25–30 degrees to horizontal, i.e., to the axis of shaft 7. When a plurality of sets of cam groove and ball elements is used, equally spaced around the axis of the rotating element, this diagonal thrust line arrangement stabilizes the device so that, excepting for possible lack of precision in manufacture, no cocking or lateral slope can take place between the discs.

It has been found that by reducing the weight of the rotational elements (disc 25 and shaft 7), very high cycle speeds can be obtained. In this respect, note that the relatively heavy core 14 and the axially movable disc 20 do not need to be rotated.

In the single acting device as described above, it is to be noted that a substantial portion of the solenoid energy has to be stored in spring 30 used to return the elements to their original position. In case the output load is such as to require substantial power on both the initial and return cycle, the output torque is very substantially reduced.

I have found, however, that the motion converting head above described is ideally adapted for double action with outside power being applied to rotate shaft 7 in both directions to provide a fully powered rotational oscillation of the output shaft 7.

Figure 5:
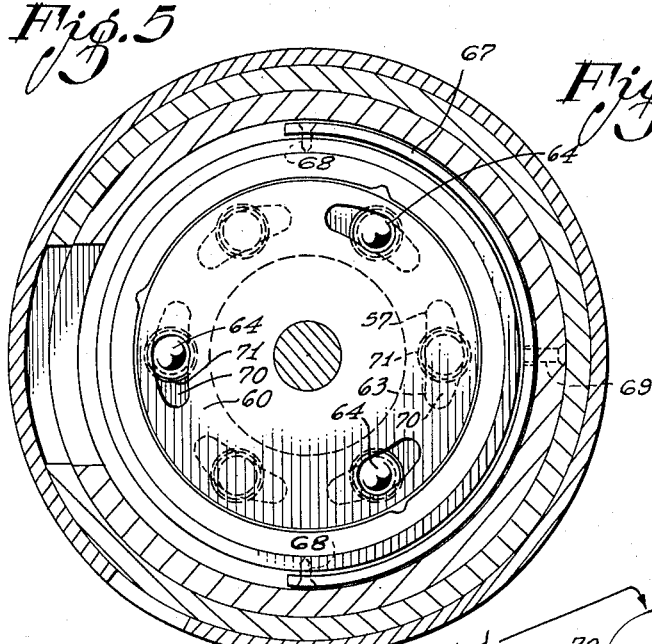
Figure 5 is a view partly in section and partly in elevation, taken as indicated by the line 5—5 in Figure 4.
Figure 6:
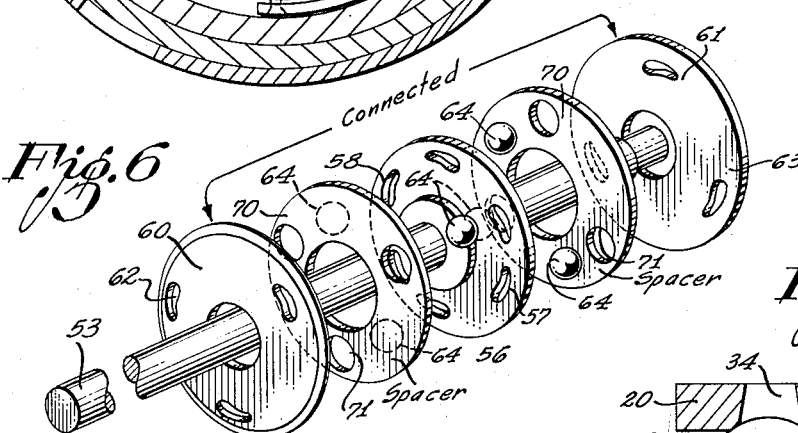
Figure 6 is an expanded view of the camming assemblies of Figure 4.

One embodiment of the invention for double action is shown in Figures 4, 5 and 6.

Referring first to Figure 4, an elongated hollow cylindrical housing 50 is provided with a thrust end plate 51 carrying a thrust bearing 52 journalling the reduced extremity of a central shaft 53, as in the first embodiment described. Shaft 53 is journalled at the other end of housing 50 by a ball bearing 54 mounted in output end plate 55.

Midway in housing 50 and solidly mounted on shaft 53 is a single driven disc 56, this disc having, illustratively, one set of three divergent edge slots 57 facing one side thereof, and a second set of three divergent edge slots 58 facing the other side thereof, these sets being staggered as best shown in Figure 6.

Positioned one on each side of and adjacent driven disc 56 are driving discs 60 and 61, each having a set of three divergent edge slots 62 and 63, respectively, cooperating with the complementary slots 57 or 58 in the central driven disc. Three balls 64 are positioned between each of the driving discs 60 and 61 and the driven disc 56, riding on the edges only of the opposed slots as in the embodiment first described herein (see Figure 7). The contours of the opposed slots are such that an axial push on one driving disc will tend to rotate driven disc 56 in one direction and an axial push on the other driving disc will tend to rotate the driven disc 56 in the opposite direction.

To accomplish rotation of the driven disc 56, the two driving discs 60 and 61 are connected together around the outside of driven disc 56 across the periphery thereof by a peripheral ring 65 at a spacing providing proper ball contact with the slots in all discs. The connected driving discs 60 and 61 are prevented from rotation by a semicircular yoke 67 diametrically and loosely fastened to peripheral ring 65 by pins 68, this yoke being loosely journalled on housing pin 69. Thus, the two driving discs can move axially together back-and-forth, but cannot rotate.

Both sets of balls 64 are synchronized by ball spacers 70, each having three circular ball apertures 71 as in the first embodiment described. The balls are positioned in the slots on the respective sides of driven disc so that when the balls on one side of driven disc 56 are in the narrowest ends of the slots with maximum spacing of the driving disc on that side, the balls on the other side of the driven disc are positioned in the largest ends of the slots to provide minimum spacing of the driving disc on that side. Thus, when the driving disc on the first side is pushed axially, the driven disc will rotate in one direction, and the balls on the other side will roll in their slot races to the narrow ends of the slots, so that a push on the driving disc on the opposite side will return the driven disc to the original rotational position. While the driving discs are oscillated axially only, the shaft 53 will thus be oscillated rotationally only. Slant surface cam groove and ball assemblies may be substituted for the ball and divergent edge slot assemblies, as described in connection with Figures 1 and 2.

As in the embodiment first described herein, the axial thrust can be provided by piston, cam or other mechanical thrust producer, but a compact useful unit is provided by solenoid operation of the motion conversion assembly 60–64, 56, 64 and 61. Each driven disc 60 and 61 is supplied by thrust from two solenoid assemblies, each comprising a magnetic circuit or core 75, coil 76, armature 77, thrust cylinder 78 and thrust shoulder 79 exactly as in the device of Figure 1, with a solenoid assembly A in one end of housing 50 and a second solenoid assembly B in the other end of housing 50. Clearance is provided for the necessary axial travel of the thrust shoulders and the assembly of discs 60 and 61 in the space between the two solenoids, as shown in Figure 4.

In operation, the solenoid A for example, driving the driven disc ready to move, is energized to create the first half of the cycle, followed by a pulse through the other solenoid B to create the second and return half of the cycle. By properly spacing the initial and return pulses to the solenoids, a predetermined cycle can readily be set up. In one operative design high oscillation rates of from 25 to 100 cycles per second have been obtained from pulses provided from a rotating double circuit breaker of the automotive type.

While I have shown ball spacers for ball synchronization, they are most useful for high cycle rates and may be dispensed with, if desired, at slow speeds.

It will clearly be seen that, except for the inertia of the parts and the camming force required to transform the axial into rotational motion, the entire power of the solenoids is applied to the load on both the initial and return strokes. No springs need to be wound up, and the frequency of the cycle can be stepped up while still maintaining high output torque. As no spring is present, phase problems due to spring response are conspicuously absent. Any desired dwell between initial and return stroke is easily provided by properly spacing the input pulses.

While in order to comply with the statute, the invention has been described in language more or less specific as to structural features, it is to be understood that the invention is not limited to the specific features shown, but that the means and construction herein disclosed comprise several preferred forms of putting the invention into effect, and the invention is, therefore, claimed in any of its forms or modifications within the legitimate and valid scope of the appended claims.

I claim:

1. An actuator cam assembly comprising a rotatable member, a shaft attached to said rotatable member and projecting in opposite directions therefrom, bearing means restricting motion of said shaft and rotatable member to rotation only, a pair of floating camming members one on each side of said rotatable member and each having an aperture therein for passage of said shaft, each of said camming members having a surface adjacent a surface of said rotatable member, mounting means for said camming members floatingly mounting said members for limited axial and universal tipping movements but restraining said members against rotation about the axis of said shaft, a plurality of opposed pairs of camming guides on the opposed surfaces of said camming members and said rotary member, a cooperating ball for each camming guide, said guides being shaped to convert reciprocal axial motion of said camming members into rotation of said rotatable member in the opposite direction relative to the motion of each camming member, and means loosely engageable with said camming members for reciprocating said camming members together to create back-and-forth rotary motion of said shaft.

2. Apparatus in accordance with claim 1 wherein means are provided to impart an axial thrust to each of said camming members.

3. Apparatus in accordance with claim 2 wherein said thrust imparting means imparts thrust in opposite directions.

4. Apparatus in accordance with claim 1 wherein solenoid actuating means is connected to impart thrust to each of said camming members in opposite directions to provide an oscillating rotation to said shaft.

5. Apparatus in accordance with claim 1 wherein said camming members are connected together to move axially in synchronism.

6. Apparatus in accordance with claim 1 wherein a solenoid armature is positioned to bear against each of said camming members.

7. An actuator cam assembly comprising a hollow cylindrical casing, a shaft, means for mounting said shaft axially in said casing for rotation only, a rotatable disc attached to said shaft to rotate therewith, a floating disc positioned adjacent and parallel to one side of said rotatable disc and apertured to surround said shaft, a semi-circular link surrounding said floating disc journalled diametrically thereto and loosely held to said casing between the journal points to prevent axial rotation of said disc and to accommodate limited axial and tipping movements thereof, opposed arcuate pairs of ball races, one portion of each pair on each disc, each pair describing a ball path inclined to the opposed surface planes of said discs, balls seated in the respective pairs of races, said balls coupling said members so that axial movement of said floating disc will impart a rotary movement to said rotatable disc, and thrust means axially engaging said floating disc, but non-rigid therewith, for imparting axial movement to said floating disc in the direction of said rotatable disc.

8. Apparatus in accordance with claim 7 wherein a solenoid coil is mounted in said casing and includes a movable armature for operating said thrust means.

9. A rotary actuator including two members rotatable and spaced axially relative to a common axis, and a plurality of circumferentially spaced cam groove and ball assemblies intercoupling said members for relative rotation of one of the members upon receipt of axial thrust from the other of the members, each of said assemblies including a pair of opposed circumferentially extending arcuate cam grooves, of arcuate cross section in radial planes through said axis, one on each of the members, and an intervening ball engaging in said opposed cam grooves, the two cam grooves of each such pair being radially located relative to said axis substantially entirely outside and inside the center of the ball, respectively, the two opposed grooves of each such pair having bottom surfaces which slant in opposite directions relative to a plane normal to said common axis, and the grooves of each such pair tapering in width in opposite circumferential directions.

10. Apparatus in accordance with claim 1, wherein said assembly is enclosed within a hollow casing, and wherein said mounting means includes a ring connecting said camming members around the outside of said rotatable member, and means loosely connecting said ring to said casing.

11. A rotary actuator comprising a hollow casing, a solenoid coil in said casing, a centrally bored core disc for said solenoid coil adjacent one end thereof including an axial projection along the longitudinal axis thereof extending into said coil, a solenoid armature movable axially toward and from said core disc projection, a floating, non-rotatable disc in said casing coaxial with and adjacent said core disc and arranged in said casing for limited axial and tipping movements, mounting means pivotally mounting said floating disc on a diametric axis of said disc, said mounting means having an anchorage with respect to said casing preventing rotation thereof about said longitudinal axis but accommodating swinging movement thereof along said longitudinal axis and pivotal movement thereof on an axis perpendicular to both said longitudinal axis and said diametric axis, a rotatable disc in said casing coaxial with said floating disc and on the opposite side thereof from said core disc, a shaft rigid with and extending axially from said rotatable disc, opposed pairs of arcuate ball races on opposed sides of said rotatable and floating non-rotatable discs, each pair describing a ball path inclined to a plane perpendicular to said shaft, balls seated in the respective pairs of races, said balls coupling said members so that axial movement of said floating discs will impart a rotary movement to said rotatable disc and shaft, and a thrust member on said armature projecting axially therefrom through said core disc and having an extremity non-rigid with but bearing against an axially opposed face of said floating disc inside the circle defined by said arcuate races.

12. The subject matter of claim 11, wherein said mounting means for said floating disc comprises a yoke extending about the periphery of said floating disc, trunnioned at its ends to diametrically opposite points of said disc and having at a mid-point thereof a loose pivot connection with respect to said casing.

13. The subject matter of claim 11, including walls closing the ends of said casing, and wherein said shaft extends between and is journalled in said end walls, said thrust member comprising a sleeve surrounding said shaft.

14. An actuator comprising a shaft, means for mounting said shaft for rotation only, a rotatable member attached to said shaft to rotate therewith, a floating non-rotatable member positioned adjacent and parallel to one side of said rotatable member, a floating mounting for said floating member including anchoring means pivotally engaging said floating member for preventing rotation thereof about the axis of said shaft and for accommodating limited axial and universal tipping movements thereof, opposed pairs of arcuate ball races on opposed sides of said rotatable member and floating non-rotatable member, each pair describing a ball path inclined to a plane perpendicular to said shaft, balls seated in the respective pairs of races, said balls coupling said members so that axial movement of said floating member will impart a rotary movement to said rotatable member, and a thrust member engageable but non-rigid with said floating member for moving said floating member axially towards said rotatable member.

References Cited in the file of this patent
UNITED STATES PATENTS

| | | |
|---|---|---|
| 1,173,576 | Hopkins | Feb. 29, 1916 |
| 2,566,571 | Leland | Sept. 4, 1951 |
| 2,828,636 | Hall | Apr. 1, 1958 |
| 2,887,889 | Parisoe | May 26, 1959 |